US012577103B2

(12) United States Patent
Saxena et al.

(10) Patent No.: US 12,577,103 B2
(45) Date of Patent: Mar. 17, 2026

(54) PROCESS AND REDOX FURNACE FOR ACID REGENERATION

(71) Applicant: Messer Industries USA, Inc., Bridgewater, NJ (US)

(72) Inventors: Neeraj Saxena, New Providence, NJ (US); Andrew Richardson, Clinton, NJ (US); Blake Stapper, Austin, TX (US); Guisu Liu, Naperville, IL (US)

(73) Assignee: Messer Industries USA, Inc., Wilmington, DE (US)

(*) Notice: Subject to any disclaimer, the term of this patent is extended or adjusted under 35 U.S.C. 154(b) by 445 days.

(21) Appl. No.: 18/137,083

(22) Filed: Apr. 20, 2023

(65) Prior Publication Data

US 2024/0351878 A1 Oct. 24, 2024

(51) Int. Cl.
C01B 17/58 (2006.01)
B01J 19/24 (2006.01)

(52) U.S. Cl.
CPC ............. C01B 17/58 (2013.01); B01J 19/245 (2013.01); B01J 2219/0004 (2013.01)

(58) Field of Classification Search
None
See application file for complete search history.

(56) References Cited

U.S. PATENT DOCUMENTS

| | | | |
|---|---|---|---|
| 2,406,930 A | 9/1946 | Titlestad | |
| 4,046,866 A | 9/1977 | Hurlburt et al. | |

| | | | |
|---|---|---|---|
| 4,376,107 A | 3/1983 | Morgenthaler | |
| 4,490,347 A | 12/1984 | Gelblum | |
| 4,748,919 A | 6/1988 | Campobenedetto et al. | |
| 5,022,332 A | 6/1991 | Ding | |
| 5,126,118 A * | 6/1992 | Hardison ............... B01D 53/52 |
| | | | 423/220 |
| 5,498,790 A | 3/1996 | Grendel et al. | |
| 5,531,169 A | 7/1996 | Mole et al. | |

(Continued)

FOREIGN PATENT DOCUMENTS

| | | |
|---|---|---|
| CN | 104876190 A | 9/2015 |
| EP | 0091679 A1 | 10/1983 |

(Continued)

OTHER PUBLICATIONS

PCT International Search Report from ISA/US for PCT/US2023/19522 filed Apr. 24, 2023, Date of Mailing: Sep. 13, 2023, Authorized Officer: Kari Rodriquez, 9 pgs.

(Continued)

*Primary Examiner* — John J Figueroa
(74) *Attorney, Agent, or Firm* — Joshua L. Cohen

(57) ABSTRACT

A RedOx furnace and process is provided for regenerating a spent sulfuric acid stream or other sulfur-containing stream by decomposing the spent sulfuric acid stream and/or other sulfur-containing stream to recover sulfur dioxide from the streams. The RedOx furnace includes a reduction chamber having an interior atmosphere, an oxidation chamber having an interior atmosphere positioned downstream from, and in fluid communication with, the reduction chamber, an inlet for supplying a spent sulfuric acid stream or other sulfur-containing stream into the interior atmosphere of the reduction chamber, and an inlet for supplying a pure oxygen stream into the interior atmosphere of the reduction chamber.

17 Claims, 2 Drawing Sheets

(56) References Cited

U.S. PATENT DOCUMENTS

| | | | |
|---|---|---|---|
| 6,399,040 B1 | 6/2002 | Dafft et al. | |
| 6,572,835 B1 | 6/2003 | MacArthur et al. | |
| 6,979,430 B2 | 12/2005 | Fan et al. | |
| 10,829,376 B2 | 11/2020 | Lykke et al. | |
| 10,995,949 B2 | 5/2021 | Schreiner et al. | |
| 2008/0063593 A1 | 3/2008 | Smith et al. | |
| 2008/0145290 A1 | 6/2008 | Daum et al. | |
| 2008/0226540 A1 | 9/2008 | Felthouse et al. | |
| 2009/0068088 A1 | 3/2009 | Daum et al. | |
| 2009/0226353 A1 | 9/2009 | Tekie et al. | |
| 2009/0226362 A1 | 9/2009 | Randolph, III et al. | |
| 2009/0317321 A1 | 12/2009 | Meagher et al. | |
| 2010/0092374 A1 | 4/2010 | Erkes et al. | |
| 2010/0284899 A1 | 11/2010 | Kita et al. | |
| 2012/0251436 A1* | 10/2012 | Alkhazov | C01B 17/0426 |
| | | | 423/574.1 |
| 2013/0028821 A1 | 1/2013 | Suchak | |
| 2013/0129589 A1* | 5/2013 | Heisel | C01B 3/58 |
| | | | 423/224 |
| 2014/0294719 A1 | 10/2014 | Schreiner | |
| 2019/0152780 A1 | 5/2019 | O'Connell | |
| 2020/0182459 A1 | 6/2020 | Schreiner et al. | |
| 2020/0280058 A1 | 9/2020 | Shen et al. | |
| 2020/0333289 A1* | 10/2020 | Asselin | G01N 27/4168 |
| 2021/0147234 A1 | 5/2021 | Daum et al. | |
| 2022/0227625 A1 | 7/2022 | Thellefsen et al. | |
| 2024/0351879 A1* | 10/2024 | Liu | C01B 17/803 |
| 2025/0206611 A1* | 6/2025 | Richardson | F23L 15/00 |

FOREIGN PATENT DOCUMENTS

| | | | |
|---|---|---|---|
| EP | 0972746 A1 | 1/2000 | |
| GB | 1527661 A1 | 10/1978 | |
| GB | 1602621 A1 | 11/1981 | |
| WO | 2022053176 A1 | 3/2022 | |
| WO | 2022083737 A1 | 4/2022 | |

OTHER PUBLICATIONS

PCT Written Opinion from ISA/US for PCT/US2023/19522 filed Apr. 24, 2023, Date of Mailing: Sep. 13, 2023, Authorized Officer: Kari Rodriguez, 11 pgs.

PCT International Search Report from ISA/US for PCT/US2023/19530 filed Apr. 24, 2023, Date of Mailing: Sep. 21, 2023, Authorized Officer: Kari Rodriquez, 10 pgs.

PCT Written Opinion from ISA/US for PCT/US2023/19530 filed Apr. 24, 2023, Date of Mailing: Sep. 21, 2023, Authorized Officer: Kari Rodriguez, 9 pgs.

PCT International Search Report from ISA/US for PCT/US2023/19558 filed Apr. 24, 2023, Date of Mailing: Sep. 27, 2023, Authorized Officer: Kari Rodriquez, 12 pgs.

PCT Written Opinion from ISA/US for PCT/US2023/19558 filed Apr. 24, 2023, Date of Mailing: Sep. 27, 2023, Authorized Officer: Kari Rodriguez, 12 pgs.

PCT International Search Report from ISA/US for PCT/US2023/19561 filed Apr. 24, 2023, Date of Mailing: Aug. 15, 2023, Authorized Officer: Kari Rodriquez, 8 pgs.

PCT Written Opinion from ISA/US for PCT/US2023/19561 filed Apr. 24, 2023, Date of Mailing: Aug. 15, 2023, Authorized Officer: Kari Rodriguez, 6 pgs.

Abumounshar, Najah Mahmoud et al., A Detailed Reaction Mechanism For Elemental Sulphur Combustion in The Furnace Of Sulphuric Acid Plants, The Canadian journal of Chemical Engineering, Dec. 23, 2020, pp. 1-11, Canada.

PCT International Search Report from ISA/US for PCT/US2022/81734 filed Dec. 16, 2022, Date of Mailing: May 3, 2023, Authorized Officer: Kari Rodriquez, 7 pgs.

PCT Written Opinion from ISA/US for PCT/US2022/81734 filed Dec. 16, 2022, Date of Mailing: May 3, 2023, Authorized Officer: Kari Rodriquez, 8 pgs.

International Preliminary Report on Patentability for PCT/US2023/019558, Date of Mailing: Oct. 30, 2025, Authorized Officer: Miki Kobayashi, 14 pages.

International Preliminary Report on Patentability for PCT/US2022/081734, Date of Mailing: Nov. 7, 2024, Authorized Officer: Agnes Wittmann-Regis, 10 pages.

\* cited by examiner

*FIG. 1*

PROCESS AND REDOX FURNACE FOR ACID REGENERATION

TECHNICAL FIELD

The present embodiments relate to an apparatus and process for regenerating a spent acid stream or a precursor-containing stream. Illustrative embodiments relate to a multiple chamber furnace and process for preparing sulfur dioxide from a spent sulfuric acid stream or other sulfur-containing streams.

BACKGROUND OF THE INVENTION

Spent sulfuric acid streams and other sulfur-containing streams may be recovered in a spent sulfuric acid decomposition furnace to produce sulfur dioxide. The sulfur dioxide may be used for producing pure sulfuric acid.

A suitable decomposition furnace for converting spent sulfuric acid streams and other sulfur-containing streams is a multiple chamber RedOx-type furnace (reduction-oxidation), also known as a RedOx furnace and similarly referred to herein, having an upstream reduction chamber followed downstream by an oxidation chamber. More particularly, a RedOx furnace is a two-stage combustion system in which a first stage is operated with an insufficient amount of air or oxygen to complete the combustions/oxidation process, such that more air or oxygen is introduced upstream of or into a second stage, or oxidation stage, of the furnace and in which the combustion/oxidation process is completed. The RedOx furnace inhibits certain reactions in the furnace (primarily nitrogen oxides or NOx formation) that would otherwise accompany reactions in a single stage furnace.

In the upstream reduction chamber of the RedOx furnace, the ratio of the atmospheric combustion air to the combustion fuel is typically set to maintain "rich" combustion conditions (i.e., a deficit of atmospheric combustion air relative to the combustion fuel). Under rich combustion conditions, the amount of oxygen present is less than is required for complete/stoichiometric oxidation of the spent sulfuric acid or other sulfur-containing compounds, and the combustion fuel.

The sub-stoichiometric condition in the reduction chamber generates more carbon monoxide (CO), more hydrogen sulfide ($H_2S$), and forms less NOx, during the conversion of combustion fuels and the spent sulfuric acid or other sulfur-containing compounds in the gaseous phase.

Additional atmospheric combustion air is supplied to the downstream oxidation chamber of the RedOx furnace to complete the oxidation of the CO and $H_2S$ to $CO_2$ and $SO_2$. The conversion of CO and $H_2S$ to $CO_2$ and $SO_2$ in the oxidation chamber occurs at lower peak temperatures resulting in lower NOx formation rates.

Conversion of spent sulfuric acid streams or other sulfur-containing streams by the RedOx furnace involves three stages, namely, a stage in the reduction reaction chamber, a stage in the oxidation chamber downstream of the reduction reaction chamber, and a stage at a duct interconnecting the reduction reaction chamber with the oxidation chamber where additional air is introduced.

A RedOx furnace operating at full capacity is limited by operating constraints, including the pressure drop through the furnace, the temperature of the gas emitted or exhausted from the furnace, the furnace stoichiometry, and NOx emission limits for the furnace.

Known processes have proposed adding supplemental oxygen to the combustion air entering the reduction furnace which allows for the decomposition in the furnace of an increased amount of spent acid or other sulfur-containing streams. This produces more sulfur dioxide which is the feedstock to prepare pure sulfuric acid. However, merely adding oxygen to the combustion air also increases the volumetric flow rate through the furnace, thereby causing an unacceptable increase in the pressure drop across the same furnace.

The RedOx conversion process is particularly vulnerable to sudden variations in the spent sulfuric acid or other sulfur-containing streams, especially those sulfur-containing streams originating from oil refineries. These variations cause incomplete control or partial combustion in the reduction chamber thereby resulting in a lack of control of the amount of NOx generated and of the overall combustion. The excess generation of NOx may limit the production of sulfur dioxide from the spent sulfuric acid or other sulfur-containing streams due to permitted NOx emission limits or product quality constraints for the amount of niter allowed in the sulfuric acid that is produced.

Therefore, there is a need in the art to increase the regeneration capacity of a RedOx decomposition furnace to recover more spent acid and/or produce more sulfur dioxide without increasing the amount of NOx formed, and to overcome the above-described disadvantages.

SUMMARY OF THE INVENTION

According to an illustrative embodiment of the invention, provided is a furnace comprising: a reduction chamber having an interior atmosphere; an oxidation chamber having an interior atmosphere, wherein the oxidation chamber is positioned downstream from the reduction chamber and in fluid communication with the reduction chamber; an inlet for supplying at least one of a spent sulfuric acid stream or at least one of another sulfur-containing stream into the interior atmosphere of the reduction chamber; and an inlet for supplying a pure oxygen stream into the interior atmosphere of the reduction chamber of the furnace.

According to another illustrative embodiment of the invention, provided is a process for decomposing at least one of a spent sulfuric acid stream or other sulfur-containing stream in a RedOx furnace, the process comprising: supplying at least one of the spent sulfuric acid stream or other sulfur-containing stream into a reduction chamber of the RedOx furnace; supplying a pure oxygen stream into the reduction chamber; at least partially decomposing the at least one spent sulfuric acid stream or other sulfur-containing stream in the reduction chamber; supplying the at least partially decomposed at least one spent sulfuric acid stream or other sulfur-containing stream into an oxidation chamber of the RedOx furnace; and further decomposing the at least partially decomposed at least one spent sulfuric acid stream or other sulfur-containing stream in the oxidation chamber.

The Summary of the Invention above is intended as a brief introduction to certain illustrative embodiments of the disclosure and should not be considered to limit the scope of the appended claims in any manner whatsoever.

BRIEF DESCRIPTION OF THE DRAWINGS

For a more complete understanding of the present inventive embodiments, reference may be had to the following description of exemplary embodiments considered in connection with the accompanying drawing Figures, of which:

FIG. 1 is a schematic view of an illustrative embodiment of the present process and RedOx furnace embodiments for decomposing a spent sulfuric acid stream or other sulfur-containing stream.

DETAILED DESCRIPTION

Figure 2:
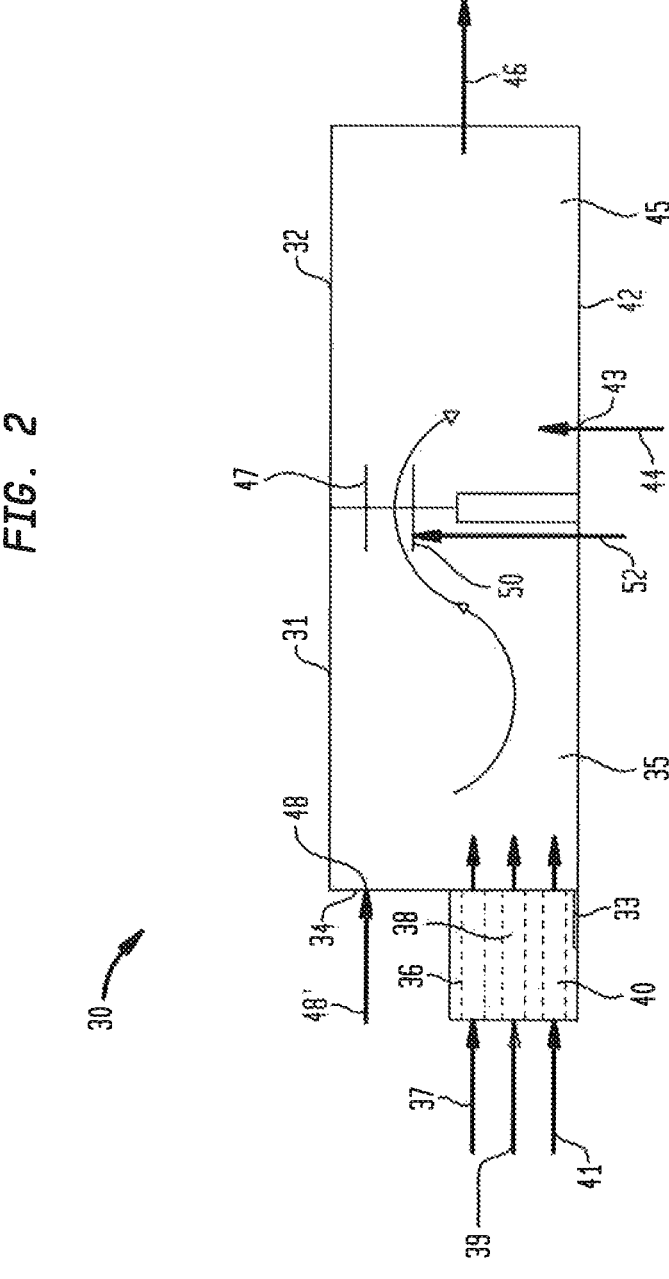
FIG. 2 is a schematic view of another illustrative embodiment of the present process and RedOx furnace embodiments for decomposing a spent sulfuric acid stream or other sulfur-containing stream.

Before explaining the inventive illustrative embodiments in detail, it is to be understood that the invention is not limited in its application to the details of construction and arrangement of parts illustrated in the accompanying drawings, if any, since the invention is capable of other embodiments and being practiced or carried out in various ways. Also, it is to be understood that the phraseology or terminology employed herein is for the purpose of description and not of limitation.

In the following description, terms such as a horizontal, upright, vertical, above, below, beneath and the like, are to be used solely for the purpose of clarity illustrating the invention and should not be taken as words of limitation. The drawings are for the purpose of illustrating the invention and are not intended to be to scale.

The term "spent sulfuric acid" as used herein refers to sulfuric acid, which after it has performed its function in an industrial process, has become diluted and at least partly neutralized by impurities, such as for example water, organics, and/or metals, making it unsuitable for immediate reuse.

Disclosed is a process for decomposing a spent acid stream or other acid precursor-containing stream in a multiple chamber RedOx furnace having a reduction chamber and an oxidation chamber. The process comprises at least partially decomposing at least one spent sulfuric acid stream or at least one other sulfur-containing stream in the reduction chamber of the multiple chamber RedOx furnace, supplying the at least partially decomposed at least one spent sulfuric acid stream or at least partially decomposed other sulfur-containing stream into the oxidation chamber of the RedOx furnace, supplying a stream selected from an atmospheric combustion air stream, an oxygen-enriched combustion air stream, and/or a pure oxygen stream into the oxidation chamber of the RedOx furnace, and fully oxidizing the at least partially decomposed at least one spent sulfuric acid stream or at least partially decomposed other sulfur-containing stream in the oxidation chamber of the RedOx furnace.

According to other illustrative embodiments, the process for decomposing at least one of a spent sulfuric acid stream or other sulfur-containing stream in a multiple chamber RedOx furnace comprises supplying at least one of the spent sulfuric acid stream or the other sulfur-containing stream into the reduction chamber of the multiple chamber RedOx furnace, supplying a pure oxygen stream into reduction chamber of the RedOx furnace, supplying a combustion fuel stream into the reduction chamber of the RedOx furnace, at least partially decomposing the at least one spent sulfuric acid stream or the at least one other sulfur-containing stream in the reduction chamber of the RedOx furnace, supplying the at least partially decomposed at least one spent sulfuric acid stream or the at least partially decomposed other sulfur-containing stream into the oxidation chamber of the RedOx furnace, supplying a stream selected from the group consisting of an atmospheric combustion air stream, an oxygen-enriched atmospheric combustion air stream, and/or a pure oxygen stream into the oxidation reaction chamber of the RedOx furnace, and fully oxidizing the at least partially decomposed at least one spent sulfuric acid stream or the at least partially decomposed other sulfur-containing stream in the oxidation chamber of the RedOx furnace.

According to certain illustrative embodiments, the processes disclosed herein increase the production capacity of a RedOx furnace to produce sulfuric dioxide from at least one spent acid stream or other sulfur-containing stream, without significantly altering the concentration of excess oxygen in the furnace exhaust; and without increasing the pressure drop within furnace, the volumetric flow rate of the furnace, the exit gas temperature of the furnace, and/or the NOx emissions from the furnace.

According to certain embodiments, the process comprises supplying the at least one of the spent sulfuric acid stream to the RedOx furnace and decomposing the at least one spent sulfuric acid stream. According to other embodiments, the process comprises supplying the at least other sulfur-containing stream to the RedOx furnace and decomposing the at least other sulfur-containing stream. Without limitation, and only by way of example, the step of supplying the at least one other sulfur-containing stream to the RedOx furnace comprises supplying a stream selected from the group consisting of a stream of elemental sulfur, a stream of a sulfur-containing compound, or a sulfur-containing refinery acid gas.

According to certain embodiments, the process comprises supplying the at least one spent sulfuric acid stream into the furnace interior by injecting the at least one spent sulfuric acid stream into the reduction chamber interior with at least one spent sulfuric acid injector engaged with the side wall of the reduction chamber and which is in fluid communication with the interior atmosphere of the reduction chamber.

According to certain embodiments, the process comprises supplying the at least one spent sulfuric acid stream into the reduction chamber interior by injecting the at least one spent sulfuric acid stream into the reduction chamber interior with at least one spent sulfuric acid injector at least partially positioned within a burner body in fluid communication with the interior atmosphere of the reduction chamber.

According to certain embodiments, the process comprises supplying the at least one other sulfur-containing stream into the reduction chamber interior by injecting the at least one other sulfur-containing stream into the reduction chamber interior with at least one other sulfur-containing stream injector engaged with the side wall of the reduction chamber and which is in fluid communication with the interior atmosphere of the reduction chamber.

According to certain embodiments, the process comprises supplying the at least one other sulfur-containing stream into the reduction chamber interior by injecting the at least one other sulfur-containing stream into the reduction chamber interior with at least one other sulfur-containing stream injector at least partially positioned within a burner body in fluid communication with the interior atmosphere of the reduction chamber.

According to certain embodiments, the process comprises supplying the combustion fuel stream into the interior atmosphere of the reduction chamber of the RedOx furnace through at least one combustion fuel stream inlet in the side wall of the RedOx furnace and in fluid communication with the interior atmosphere of the furnace.

According to certain embodiments, the process comprises supplying the combustion fuel stream into the interior atmosphere of the reduction chamber of the RedOx furnace through at least one combustion fuel stream passage that is at least partially positioned within a burner body, the at least one combustion fuel stream passage having an end opening into the interior atmosphere of the reduction chamber.

According to certain embodiments, the process comprises supplying an oxygen-enriched atmospheric combustion air stream or a pure oxygen stream into the reduction chamber interior through an inlet in the side wall of the RedOx furnace and in fluid communication with the interior atmosphere of the reduction chamber.

According to certain embodiments, the process comprises supplying an oxygen-enriched atmospheric combustion air stream or a pure oxygen stream into the reduction chamber interior through a stream passage at least partially positioned within a burner body that is in fluid communication with the interior atmosphere of the RedOx furnace.

According to certain embodiments, the process comprises supplying an oxygen-enriched atmospheric combustion air stream into the reduction chamber interior through a stream passage at least partially positioned within a burner body that is in fluid communication with the interior atmosphere of the RedOx furnace and a pure oxygen stream into the chamber interior through an inlet in the side wall of the RedOx furnace and in fluid communication with the interior atmosphere of the reduction chamber that is not at least partially positioned within a burner body.

According to certain embodiments, the process comprises supplying at least one spent sulfuric acid stream into the reduction chamber interior through an inlet in the side wall of the RedOx furnace and in fluid communication with the interior atmosphere of the reduction chamber, supplying at least one combustion fuel stream into the interior of the reduction chamber through the combustion fuel stream passage that is at least partially positioned within the burner body, and supplying an oxygen-enriched atmospheric combustion air stream or a pure oxygen stream into the reduction chamber interior through a stream passage at least partially positioned within the burner body.

According to certain embodiments, the process comprises supplying at least one spent sulfuric acid stream into the reduction chamber interior through a spent sulfuric acid stream passage that is at least partially positioned within a burner body that is in fluid communication with the interior atmosphere of the reduction chamber, supplying at least one combustion fuel stream into the interior of the reduction chamber through the combustion fuel stream passage that is at least partially positioned within the burner body, and supplying an oxygen-enriched atmospheric combustion air stream or a pure oxygen stream into the reduction chamber interior through a stream passage at least partially positioned within the burner body.

According to certain embodiments, the process comprises supplying at least one other sulfur-containing stream into the reduction chamber interior through an inlet in the side wall of the RedOx furnace and in fluid communication with the interior atmosphere of the reduction chamber, supplying at least one combustion fuel stream into the interior of the reduction chamber through the combustion fuel stream passage that is at least partially positioned within the burner body, and supplying an oxygen-enriched atmospheric combustion air stream or a pure oxygen stream into the reduction chamber interior through a stream passage at least partially positioned within the burner body According to certain embodiments, the process comprises supplying at least one other sulfur-containing stream into the reduction chamber interior through another sulfur-containing stream passage that is at least partially positioned within a burner body that is in fluid communication with the interior atmosphere of the reduction chamber, supplying at least one combustion fuel stream into the interior of the reduction chamber through the combustion fuel stream passage that is at least partially positioned within the burner body, and supplying an oxygen-enriched atmospheric combustion air stream or a pure oxygen stream into the reduction chamber interior through a stream passage at least partially positioned within the burner body.

The other sulfur-containing streams that may be used in the process may comprise, for example, and without limitation, a stream of elemental sulfur, a stream of a sulfur-containing compound, or a sulfur-containing refinery acid gas.

The atmospheric combustion air stream used in typical RedOx regeneration processes accounts for a significant fraction of the mass entering the reduction chamber of the RedOx furnace and is the primary source of the nitrogen that is oxidized to form NOx. Because the combustion air is primarily made of nitrogen, it is possible to offset some or all of the atmospheric air with pure oxygen so that the process requires less total mass of oxygen and combustion air to achieve complete combustion in the RedOx regeneration process. The replacement of a sufficient mass of the combustion air with oxygen results in an increase in the capacity of the furnace to oxidize sulfur-containing compounds without increasing the total mass flow rate.

It is known that oxygen enrichment of the combustion air at a constant stoichiometry raises the flame and combustion product temperatures which has an adverse effect on NOx formation and can be deleterious to the furnace refractory life. For these reasons, the presently disclosed process supplies at least one stream of pure oxygen through direct pure oxygen passages or injectors into the reduction chamber of the decomposition furnace.

The RedOx spent acid decomposition process creates a sub-stoichiometry in the reduction chamber of the RedOx furnace. This embodiment uses a pure oxygen stream instead of at least some of the atmospheric combustion air to reduce the volume of gases entering the RedOx furnace. The temperature in the internal combustion atmosphere of the reduction chamber of the RedOx furnace is maintained at a temperature sufficient to at least partially oxidize the combustion fuel, and decompose the spent sulfuric acid stream. The sub-stoichiometric atmosphere reduces most of the thermally created NOx species.

The at least partially decomposed spent sulfuric acid stream or other sulfur-containing stream enters the downstream oxidation chamber of the RedOx furnace. During the oxidation reaction stage of the process, atmospheric air, oxygen-enriched atmospheric air, or pure oxygen is supplied the interior atmosphere of the oxidation chamber of the furnace. In other embodiments, the atmospheric air, oxygen-enriched air, or pure oxygen is introduced into the duct that connects the reduction chamber to the oxidation chamber, so that it is mixed with the at least partially decomposed spent sulfuric acid stream or other sulfur-containing stream prior to entering the oxidation chamber. The addition of the atmospheric air, oxygen-enriched atmospheric air, and/or pure oxygen to the interior atmosphere of the oxidation chamber of the furnace achieves complete combustion of other species in the streams without forming a high-temperature flame zone and without thermally forming any additional NOx species.

The pure oxygen stream(s) may be introduced into the reduction chamber of the RedOx decomposition furnace through at least one high velocity, preferably sonic, nozzle to produce high velocity oxygen jets proximate the burner flames, spent sulfuric acid, and other sulfur-containing streams. The high velocity oxygen jets entrain and mix with hot furnace atmosphere that contains reacted and partially unreacted combustibles and causes their oxidation in a diffuse manner. Such diffuse oxidation reactions avoid the peak flame temperatures seen in conventional combustion that drive NOx formation and distribute the overall reactions over a larger region than in the confluence zone of the main burners. According to certain illustrative embodiments, the pure oxygen stream or stream may be introduced into the internal atmosphere of the reduction chamber of the RedOx furnace via a passage that is in fluid communication with a source of pure oxygen and the internal atmosphere of the reduction chamber. The pure oxygen stream passage has one opening that is in fluid communication with the source of pure oxygen and another opening that opens up into the interior of the reduction chamber.

The RedOx furnace includes a controller to control a plurality of flows of spent sulfuric acid, combustion fuel, atmospheric air, and pure oxygen into the reduction chamber of the furnace, and to control the flow of the at least one of atmospheric combustion air, oxygen-enriched atmospheric combustion air, and pure oxygen either upstream of or into the oxidation chamber of the furnace. A flow train of the controller provides basic safety functions, including automatic oxygen shut-off valves activated by excessive process deviations among such as pressures, flows, temperatures, process interlocks and emergency stops. To modulate and measure the flows, the flow train also includes inlet pressure regulation, flow meters and flow control valves connected to the controller.

The controller may be in communication with the oxygen flow control of the flow train, and the temperature sensor. The controller or control routine is in communication with the temperature sensor, flow meters and control valves of the oxygen flow train. The controller maintains the total oxygen flow at the desired oxygen flow set point and determines the actual flows to the reduction chamber based on the temperature deviation between the temperature indicated by the temperature sensing element and the desired combustion zone setpoint temperature. As the temperature at the temperature sensing element falls below the setpoint temperature, the controller instructs oxygen flow train control valves to deliver a greater oxygen flow to the oxygen enriched combustion air thereby maintaining a constant total oxygen flow at the desired total oxygen flow setpoint. Conversely, if the temperature at the temperature sensing element rises above the setpoint temperature range, the controller instructs the oxygen flow train control valves to deliver a smaller oxygen flow to the reduction chamber, thereby maintaining a constant total oxygen flow at the desired total oxygen flow setpoint. Such control functions are readily achievable with known industrial controllers such a programmable-logic-controllers (PLC), distributed control systems (DCS) or microprocessor-based controls incorporating functions such as proportional-integral-derivative (PID) loop, on-off and dead-band functions.

According to certain embodiments, an oxygen analyzer may be located at the oxidation chamber outlet to maintain a target level of excess oxygen in the exhaust, and the oxygen flow introduced downstream of the reduction chamber is adjusted to maintain the target.

At least one spent acid stream is supplied into the reduction chamber through an inlet formed in the wall of the reduction chamber that is in fluid communication with a conduit carrying the spent acid stream.

According to certain illustrative embodiments, at least one spent acid stream may be pre-heated prior to introducing the stream into the reduction chamber of the RedOx furnace. The pre-heating of the spent acid stream may be carried out by indirectly heating the conduit(s) or pipe(s) supplying the one or more streams to the reduction chamber. According to certain illustrative embodiments, the spent acid stream is not pre-heated before it is supplied into the reduction chamber of the RedOx furnace.

According to other illustrative embodiments, the pure oxygen stream may be pre-heated prior to introducing the pure oxygen stream into the reduction chamber of the RedOx furnace. For example, and without limitation, the pure oxygen stream may be indirectly heated by a suitable heater prior to introducing the stream into the reduction chamber while this stream is being supplied through a suitable conduit.

According to other illustrative embodiments, the atmospheric combustion air stream, the oxygen-enriched combustion air stream, or the pure oxygen stream that is introduced through the burner body may be pre-heated prior to introducing the stream into the reduction chamber of the RedOx furnace.

According to other illustrative embodiments, the atmospheric combustion air stream, the oxygen-enriched combustion air stream, or the pure oxygen stream may be pre-heated prior to introducing the stream into the oxidation chamber of the RedOx furnace or into the duct connecting the reduction chamber to the oxidation chamber. For example, and without limitation, the stream may be indirectly heated by a suitable heater prior to introducing the stream into the oxidation chamber or into the duct upstream of the oxidation chamber while this stream is being supplied through a suitable conduit.

The RedOx furnace for regenerating a spent sulfuric acid stream or other sulfur-containing stream comprises a reduction chamber and an oxidation chamber that are in fluid communication. As it pertains to the direction of flow of the products, the reduction chamber is positioned upstream from the oxidation chamber and the oxidation chamber is positioned downstream from the reduction chamber. The reduction chamber and oxidation chamber of the RedOx furnace are in fluid communication through, for example, at least one suitable conduit, duct, pipe, tube, or the like.

Each of the reduction chamber and oxidation chamber of the RedOx furnace includes an outer housing defined by a plurality of walls and an inner volume defining an interior combustion atmosphere.

The reduction chamber of the RedOx furnace includes a plurality of inlets for streaming, introducing, or otherwise supplying the various gas streams required by the regeneration process into the interior atmosphere of the reduction chamber of the RedOx furnace. By way of illustration, the reduction chamber includes at least one inlet for streaming each of the at least one spent sulfuric acid stream, the at least one other sulfur-containing stream, the at least combustion fuel stream, the atmospheric air or oxygen-enhanced atmospheric air, and the at least one pure oxygen stream into the reduction chamber of the furnace.

The RedOx furnace includes at least one inlet in fluid communication with the duct for supplying a stream selected from the group consisting of an atmospheric combustion air stream, an oxygen-enriched atmospheric combustion air stream and a pure oxygen stream to the interior atmosphere of the oxidation reaction chamber of the furnace or to the at least one suitable conduit, duct, pipe, tube, or the like that maintains the fluid communication between the reduction chamber and the oxidation chamber.

The RedOx furnace may further include at least one burner that is engaged with a side wall of the reduction chamber of the RedOx furnace and that is in fluid communication with the interior atmosphere of the reduction chamber of the furnace.

According to certain embodiments, the burner may include at least one passage for supplying at least one spent sulfuric acid stream from a source or supply of spent sulfuric acid into the interior atmosphere of the reduction chamber of the RedOx furnace.

According to certain embodiments, the burner may include at least one passage for supplying at least one other sulfur-containing stream from a source or supply of the other sulfur-containing stream into the interior atmosphere of the reduction chamber of the RedOx furnace.

According to certain embodiments, the burner may include at least one passage for supplying at least one spent sulfuric acid stream from a source or supply of spent sulfuric acid into the interior atmosphere of the reduction chamber of the RedOx furnace and the burner may include at least one passage for supplying at least one other sulfur-containing stream from a source or supply of the other sulfur-containing stream into the interior atmosphere of the reduction chamber of the furnace.

According to certain embodiments, the burner comprises at least one pure oxygen stream passage at least partially positioned within the burner for supplying at least one pure oxygen stream from a source or supply of pure oxygen into the interior atmosphere of the reduction chamber of the RedOx furnace.

According to certain embodiments, the burner comprises at least one combustion fuel stream passage at least partially positioned within the burner for supplying at least one combustion fuel stream from a source or supply of combustion fuel into the interior atmosphere of the reduction chamber of the RedOx furnace.

The RedOx furnace is in fluid communication with a supply of spent sulfuric acid stream and/or other sulfur-containing stream. The source of spent acid stream or other sulfur-containing stream is in fluid communication with the interior of the reduction chamber of the furnace. The furnace includes an inlet for supplying a spent acid stream or other sulfur-containing stream into the reduction chamber of the furnace. A suitable heater may be positioned at any point between the source of the spent sulfuric acid stream and/or other sulfur-containing stream and the inlet(s) of the reduction chamber of the furnace for preheating the spent acid stream and/or other sulfur-containing stream before it is fed into the interior of the reduction chamber of the furnace.

The RedOx furnace is in fluid communication with a suitable supply of pure oxygen that is in fluid communication with the conduits or piping carrying the oxygen from the supply of pure oxygen into the reduction chamber of the furnace. According to certain embodiments, there is a suitable conduit or piping extending directly between, and in fluid communication with, the source or supply of oxygen and the reduction chamber of the furnace to provide a stream of oxygen gas directly into the reduction chamber. A suitable heater may be positioned at any point between the source of oxygen and the oxygen gas inlet of the furnace for preheating the oxygen gas before it is fed into the reduction chamber of the furnace.

The RedOx furnace is in fluid communication with a suitable supply of atmospheric air that is in fluid communication with the conduits or piping carrying the air into the reduction chamber of the furnace. According to certain embodiments, there is a suitable conduit or piping extending directly between, and in fluid communication with, a source or supply of pure oxygen and the atmospheric air stream, so that pure oxygen may be introduced to provide a stream of oxygen-enriched air through at least one burner and into the reduction chamber. A suitable heater may be positioned at any point between the source of oxygen-enriched air and the oxygen-enriched air gas inlet of the burner for preheating the oxygen-enriched gas before it is fed through the burner and into the reduction chamber of the furnace.

The RedOx furnace is in fluid communication with a suitable supply of combustion fuel. The combustion fuel is supplied from the supply to the interior of the reduction chamber of the furnace by suitable conduits or piping that are in fluid communication between the supply of combustion fuel and the interior of the reduction chamber of the furnace.

The combustion fuel stream that is supplied to the reduction chamber of the furnace may comprise a gaseous fuel selected from at least one of methane, natural gas, liquefied natural gas, propane, liquefied propane gas, butane, low BTU gases, town gas, producer gas, refinery fuel gas, hydrogen, carbon monoxide, and mixtures thereof. According to other embodiments, the combustion fuel stream may comprise an atomized liquid fuel selected from at least one of heavy fuel oil, medium fuel oil, light fuel oil, kerosene, diesel, and mixtures thereof. According to further embodiments, the combustion fuel stream may comprise a particulate solid fuel selected from at least one of coal, coke, petroleum coke, rubber, woodchips, sawdust, straw, biomass fuels, and mixtures thereof suspended in a carrier gas stream delivered to the furnace. The carrier gas stream may be selected from at least one of air, nitrogen, carbon dioxide and a gaseous fuel, the gaseous fuel selected from at least one of methane, natural gas, liquefied natural gas, propane, liquefied propane gas, butane, low BTU gases, town gas, producer gas, hydrogen, carbon monoxide, and mixtures thereof.

The oxidation chamber of the RedOx furnace is in fluid communication with a suitable conduit that carries the exhaust from the reduction furnace and a suitable supply of atmospheric combustion air, oxygen-enriched atmospheric combustion air, or pure oxygen. The apparatus includes at least one inlet for supplying a stream of atmospheric combustion air, oxygen-enriched atmospheric combustion air, or pure oxygen into the suitable conduit.

In another embodiment, the atmospheric combustion air, oxygen-enriched atmospheric combustion air, or pure oxygen is supplied from the supply into the oxidation chamber of the furnace by suitable conduits or piping that are in fluid communication between the supply and the oxidation chamber of the furnace. The apparatus includes at least one inlet for supplying a stream of atmospheric combustion air, oxygen-enriched atmospheric combustion air, or pure oxygen into the oxidation chamber of the furnace.

A suitable heater may be used to heat a suitable supply of atmospheric combustion air, oxygen-enriched atmospheric combustion air, or pure oxygen prior to being supplied to the oxidation chamber of the RedOx furnace. The atmospheric combustion air, oxygen-enriched atmospheric combustion air, or pure oxygen is supplied from a supply into the oxidation chamber of the furnace by suitable conduits or piping that are in fluid communication between the supply and the oxidation chamber of the furnace with a suitable heater being positioned between the supply and the inlet of the oxidation chamber of the RedOx furnace. In another embodiment, the suitable supply of atmospheric combustion air, oxygen-enriched atmospheric combustion air, or pure oxygen is heated prior to being supplied to the suitable conduit that delivers the reduction chamber exhaust to the oxidation chamber.

Figure 1:
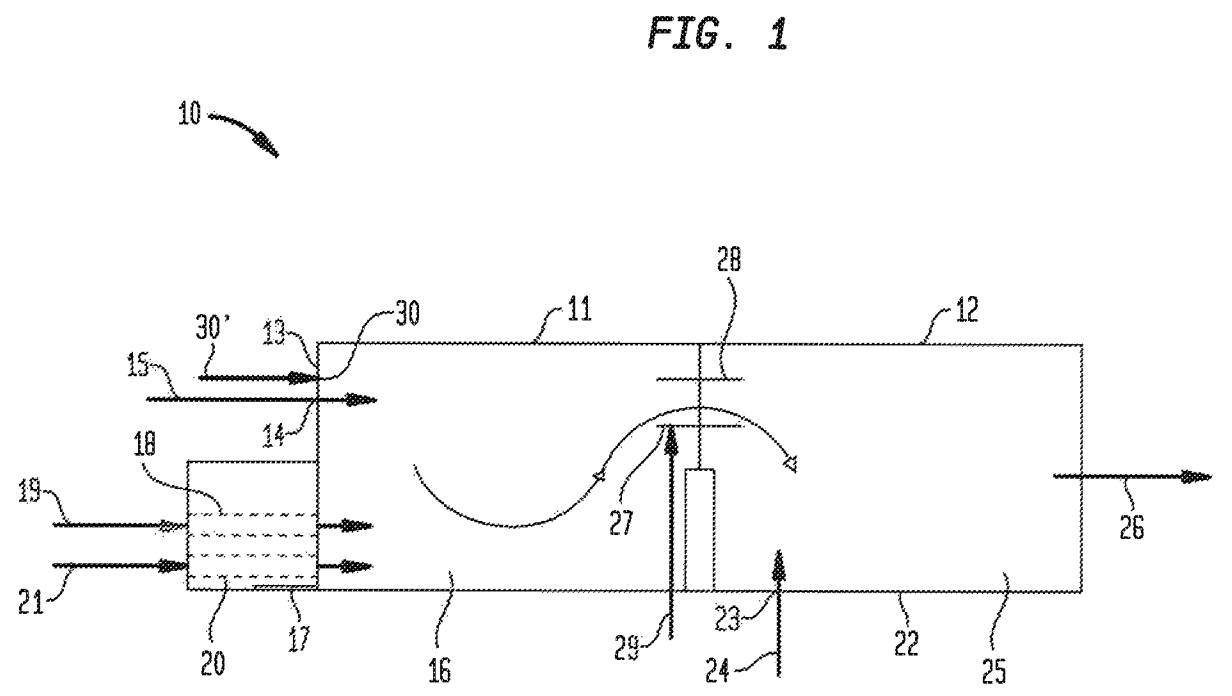

FIG. 1 is a schematic view of an illustrative embodiment of a RedOx-type furnace 10 or RedOx furnace of the present embodiments. Redox furnace 10 includes reduction chamber 11 and downstream oxidation chamber 12 that are in fluid communication with each other. The chambers 11,12 may be connected for fluid communication with each other by a conduit 28 or duct. Reduction chamber 11 includes a side wall 13. Side wall 13 includes an inlet 14 for supplying a spent sulfuric acid stream 15 or another sulfur-containing stream 15 into the internal combustion atmosphere 16 of the reduction chamber 11. The streams 15 may be from a spent acid injector field disposed at the side wall 13. Side wall 13 also includes an inlet 30 for supplying a pure oxygen stream 30' into the internal combustion atmosphere 16 of the reduction chamber 11. At least one burner 17 is engaged with side wall 13 of the reduction chamber 11 and is in fluid communication with the internal combustion atmosphere 16 of reduction chamber 11. Burner 17 includes a combustion fuel passage 18 for supplying a combustion fuel stream 19 to the internal combustion atmosphere 16 of chamber 11. Burner 17 includes a passage 20 for supplying a stream 21 of atmospheric combustion air, oxygen-enriched atmospheric combustion air, or pure oxygen into the internal combustion atmosphere 16 of redox reaction chamber 11. As mentioned above, oxidation chamber 12 is connected to reduction chamber 11 by the conduit 28. Conduit 28 may include an inlet 27 for supplying a stream 29 of atmospheric combustion air, oxygen-enriched atmospheric combustion air, or pure oxygen into the conduit 28 to mix with the combustion atmosphere 16 from the reduction chamber 11 enroute to the oxidation chamber 12. Oxidation chamber 12 includes a wall 22. Wall 22 includes an inlet 23 leading to the internal atmosphere 25. Alternatively, or in addition thereto, inlet 23 supplies a stream 24 of atmospheric combustion air, oxygen-enriched atmospheric combustion air, or pure oxygen into the internal atmosphere 25 of the oxidation chamber 12. The regenerated stream 26 exits an outlet at the downstream end of the oxidation chamber 12 and continues to a gas conditioning system located upstream of, for example, a catalytic converter.

FIG. 2 is a schematic view of another illustrative embodiment of a RedOx-type furnace 30 or RedOx furnace of the present embodiments. RedOx furnace 30 includes reduction chamber 31 and downstream oxidation chamber 32 that are in fluid communication with each other. The chambers 31,32 may be connected by a conduit 47 or duct. Reduction chamber 31 includes a side wall 34. Side wall 34 includes an inlet 48 for supplying a pure oxygen stream 48' into the internal combustion atmosphere 35 of the reduction chamber 31. At least one burner 33 is engaged with side wall 34 of the reduction chamber 31 and is in fluid communication with the internal combustion atmosphere 35 of the chamber 31. Burner 33 includes a passage 36 for supplying a spent sulfuric acid stream 37 or another sulfur-containing stream 37 into the internal combustion atmosphere 35 of the reduction chamber 31. Burner 33 also includes a combustion fuel passage 38 for supplying a combustion fuel stream 39 to the internal combustion atmosphere 35. Burner 33 includes a pure oxygen passage 40 for supplying a pure oxygen stream 41 to the internal combustion atmosphere 35. As mentioned above, oxidation chamber 32 of furnace 10 is connected to reduction chamber 31 by the conduit 47. Conduit 47 may include an inlet 50 for supplying a stream 52 of atmospheric combustion air, oxygen-enriched atmospheric combustion air, or pure oxygen into the conduit 47 to mix with the internal combustion atmosphere 35 from the reduction chamber 31 enroute to the oxidation chamber 32. Oxidation chamber 32 includes wall 42. Wall 42 includes inlet 43 leading to the internal atmosphere 45. Alternatively, or in addition thereto, inlet 43 supplies a stream 44 of atmospheric combustion air, oxygen-enriched atmospheric combustion air, or pure oxygen into the internal atmosphere 45 of the oxidation chamber 32. The regenerated stream 46 exits an outlet at the downstream end of the oxidation chamber 32 and continues to a gas conditioning system located upstream of, for example, a catalytic converter.

According to the disclosed embodiments of the process and the apparatus, controlled supply of oxygen is divided between a stream of atmospheric combustion air, oxygen-enriched atmospheric combustion air, or pure oxygen that is supplied to the burner in the reduction chamber of the furnace, a pure oxygen stream that is supplied through a separate inlet to the reduction furnace and a stream of atmospheric combustion air, oxygen-enriched atmospheric combustion air, or pure oxygen that is supplied to the conduit that connects the reduction chamber to the oxidation chamber of the RedOx furnace, or directly into the oxidation chamber of the furnace.

According to the disclosed embodiments of the process and the RedOx furnace, the capacity to oxidize sulfur-containing compounds from a stream is increased.

According to the disclosed embodiments of the process and the RedOx furnace, the atmospheric combustion air that is introduced into the reduction chamber of the RedOx furnace is reduced or eliminated and replaced with pure oxygen.

According to the disclosed embodiments of the process and the RedOx furnace, the capacity of the furnace to recover sulfur dioxide from a spent sulfuric acid stream or other stream containing a sulfur-containing compound is increased by injecting at least one pure oxygen stream in the reduction chamber of the RedOx furnace.

According to the disclosed embodiments of the process and the RedOx furnace, the capacity of the furnace to recover sulfur dioxide from a spent sulfuric acid stream or other stream containing a sulfur-containing compound is increased by injecting a stream of atmospheric combustion air, oxygen-enriched atmospheric combustion air, or pure oxygen into or upstream of the oxidation chamber of the RedOx furnace.

The disclosed embodiments of the process and the RedOx furnace provide the ability to control the combustion conditions within the furnace and limit the NOx formation by supplying at least one pure oxygen stream in the reduction chamber of the RedOx furnace.

According to the disclosed embodiments of the process and the RedOx furnace, the production of sulfur dioxide is increased without increasing NOx emissions from the furnace.

According to the disclosed embodiments of the process and the RedOx furnace, the production of sulfur dioxide is increased without increasing the gas temperature of the exhaust from the furnace.

According to the disclosed embodiments of the process and the RedOx furnace, the production of sulfur dioxide is increased without increasing the concentration of oxygen in the exhaust from the furnace.

According to the disclosed embodiments of the process and the RedOx furnace, the production of sulfur dioxide is increased without increasing the volumetric flow rate exiting the furnace.

According to the disclosed embodiments of the process and the RedOx furnace, the production of sulfur dioxide is increased without increasing the pressure drop across the furnace.

Illustrative embodiments of the process for regenerating a spent acid stream or other acid precursor-containing stream of the present disclosure include:

In a first illustrative embodiment, provided is a process for decomposing at least one of a spent sulfuric acid stream or other sulfur-containing stream in a multiple chamber RedOx furnace, the process comprising: supplying at least one of the spent sulfuric acid stream or the other sulfur-containing stream into the reduction chamber of the multiple chamber RedOx furnace; supplying a pure oxygen stream into the reduction chamber of the RedOx furnace; supplying a stream of atmospheric combustion air, oxygen-enriched atmospheric combustion air, or pure oxygen to the burner in the reduction chamber of the multiple chamber RedOx furnace; supplying a combustion fuel stream into the reduction chamber of the RedOx furnace; at least partially decomposing the at least one spent sulfuric acid stream or other sulfur-containing stream in the redox chamber of the RedOx furnace; supplying the at least partially decomposed at least one spent sulfuric acid stream or other sulfur-containing stream into the oxidation chamber of the RedOx furnace; and further decomposing the at least partially decomposed at least one spent sulfuric acid stream or other sulfur-containing stream in the oxidation chamber of the RedOx furnace.

According to a second illustrative embodiment, the process of the first embodiment further comprises supplying a combustion fuel into the reduction chamber of the RedOx furnace through at least one combustion fuel stream passage that is at least partially positioned within a burner, the at least one combustion fuel stream passage having an end opening into the reduction chamber of the RedOx furnace.

According to a third illustrative embodiment, the process of the first illustrative embodiment comprising supplying the other sulfur-containing stream comprises supplying a stream selected from the group consisting of a stream of elemental sulfur, a stream of a sulfur-containing compound, or a sulfur-containing refinery acid gas stream.

According to a fourth illustrative embodiment, the process of any one of the first to third illustrative embodiments comprising supplying the at least one spent sulfuric acid stream into the reduction chamber of the RedOx furnace comprises injecting the at least one spent sulfuric acid stream into the reduction chamber with at least one spent sulfuric acid injector at least partially positioned within a burner body or supplying the at least one other sulfur-containing stream into the reduction chamber by injecting the at least one other sulfur-containing stream into the reduction chamber with at least one other sulfur-containing stream injector at least partially positioned within the burner.

According to a fifth illustrative embodiment, the process of any one of the first to fourth illustrative embodiments comprising supplying a stream of atmospheric combustion air, oxygen-enriched atmospheric combustion air, or pure oxygen into the reduction chamber comprises supplying through a passage at least partially positioned within a burner.

According to a sixth illustrative embodiment, the process of any one of the first to fifth illustrative embodiments comprises supplying at least one spent sulfuric acid stream into the furnace interior through a spent sulfuric acid stream passage that is at least partially positioned within a burner, supplying at least one combustion fuel stream into the interior of the furnace through the combustion fuel stream passage that is at least partially positioned within the burner, and supplying at least one stream of atmospheric combustion air, oxygen-enriched atmospheric combustion air, or pure oxygen into the interior of the furnace through a stream passage that is at least partially positioned within the burner.

According to a seventh illustrative embodiment, the process of any one of the first to fifth illustrative embodiments comprises supplying at least one other sulfur-containing stream into the furnace interior through another sulfur-containing stream passage that is at least partially positioned within a burner, supplying at least one combustion fuel stream into the interior of the furnace through the combustion fuel stream passage that is at least partially positioned within the burner, and supplying at least one stream of atmospheric combustion air, oxygen-enriched atmospheric combustion air, or pure oxygen into the interior of the furnace through a stream passage that is at least partially positioned within the burner.

According to an eighth illustrative embodiment, the process of any one of the first to seventh illustrative embodiments comprises supplying pure oxygen directly into the reduction chamber of the RedOx furnace through a pure oxygen injector in direct fluid communication with the interior of the furnace.

According to a ninth illustrative embodiment, the process of any one of the first to eighth illustrative embodiments comprises supplying a stream selected from the group consisting of atmospheric combustion air stream, an oxygen-enriched atmospheric combustion air stream, and pure oxygen stream into the oxidation chamber of the RedOx furnace.

According to a tenth illustrative embodiment, the process of any one of the first to ninth illustrative embodiments comprises supplying a stream selected from the group consisting of atmospheric combustion air stream, an oxygen-enriched atmospheric combustion air stream, and pure oxygen stream into the conduit that is in fluid communication between the reduction chamber and the oxidation chamber of the RedOx furnace.

According to an eleventh illustrative embodiment, the process of any one of the first to tenth illustrative embodiments comprises heating the atmospheric combustion air stream, the oxygen-enriched atmospheric combustion air stream, or the pure oxygen stream prior to the supplying the atmospheric combustion air stream, the oxygen-enriched atmospheric combustion air stream, or the pure oxygen stream into the conduit upstream of the oxidation chamber or directly into the oxidation chamber of the RedOx furnace.

According to a twelfth illustrative embodiment, the process of any one of the first to eleventh illustrative embodiments comprises introducing pure oxygen into the atmospheric combustion air to prepare an oxygen-enriched combustion air prior to the supplying oxygen-enriched combustion air into the conduit upstream of the oxidation chamber or directly into the oxidation chamber of the RedOx furnace.

According to a thirteenth illustrative embodiment of the process for decomposing at least one spent acid stream or other sulfur-containing stream, provided is the process of any one of the first through twelfth illustrative embodiments, wherein the process increases the capacity of the furnace to produce sulfur dioxide from the at least one spent acid stream or other sulfur-containing stream without increasing pressure drop through the furnace.

According to a fourteenth illustrative embodiment of the process for decomposing at least one spent acid stream or other sulfur-containing stream, provided is the process of any one of the first through thirteenth illustrative embodiments, wherein the process increases a capacity of the furnace to produce sulfur dioxide from the at least one spent acid stream or other sulfur-containing stream without increasing volumetric flow rate of the furnace.

According to a fifteenth illustrative embodiment of the process for decomposing at least one spent acid stream or other sulfur-containing stream, provided is the process of any one of the first through fourteenth illustrative embodiments, wherein the process increases a capacity of the furnace to produce sulfur dioxide from the at least one spent acid stream or other sulfur-containing stream without increasing the furnace exit gas temperature.

According to a sixteenth illustrative embodiment of the process for decomposing at least one spent acid stream or other sulfur-containing stream, provided is the process of any one of the first through fifteenth illustrative embodiments, wherein the process increases a capacity of the furnace to produce sulfur dioxide from the at least one spent acid stream or other sulfur-containing stream without increasing NOx emissions.

According to an seventeenth illustrative embodiment of the process for decomposing at least one spent acid stream or other sulfur-containing stream, provided is the process of any one of the first through sixteenth illustrative embodiments, wherein a proportion of oxygen delivered to the combustion air stream and to the one or plurality of injectors is determined based on either the measured temperature proximate the flame, or a theoretical adiabatic temperature of a mixture of fuel, air, oxygen and sulfur-containing stream delivered through the one or plurality of injectors.

Illustrative embodiments of the RedOx regeneration furnace for use in the process for regenerating a spent acid stream or other acid precursor-containing stream of the present disclosure include:

In a first illustrative embodiment, a RedOx furnace comprises a reduction chamber having an interior atmosphere; an oxidation chamber having an interior atmosphere, wherein the oxidation chamber is positioned downstream from the redox chamber and in fluid communication with the redox chamber; an inlet for supplying at least one of a spent sulfuric acid stream or sulfur-containing stream into the interior atmosphere of the reduction chamber; and an inlet for supplying a pure oxygen stream to the interior atmosphere of the reduction chamber.

According to a second illustrative embodiment, the RedOx furnace of the first illustrative embodiment comprises an inlet for supplying an atmospheric combustion air, an oxygen-enriched combustion air stream, or a pure oxygen stream into the conduit that is in direct communication between the reduction chamber and the oxidation chamber or directly into the interior of the oxidation chamber.

According to a third illustrative embodiment, the RedOx furnace of the first or second illustrative embodiments comprises an inlet for supplying a combustion fuel stream to the interior atmosphere of the reduction chamber.

According to a fourth illustrative embodiment, the RedOx furnace of any one of the first to third illustrative embodiments comprises an inlet in fluid communication with the reduction chamber for supplying a pure oxygen stream to the interior atmosphere of the reduction chamber.

According to a fifth illustrative embodiment, the RedOx furnace of any one of the first to fourth illustrative embodiments comprises a duct in fluid communication with the reduction chamber and the oxidation chamber.

According to a sixth illustrative embodiment, the RedOx furnace of any one of the first to fifth illustrative embodiments comprises an inlet in fluid communication with the duct for supplying a stream selected from the group consisting of an atmospheric combustion air stream, an oxygen-enriched atmospheric combustion air stream and a pure oxygen stream to the interior atmosphere of the oxidation reaction chamber.

According to a seventh illustrative embodiment, the RedOx furnace of any one of the first to sixth illustrative embodiments, further comprising a supply of spent sulfuric acid in fluid communication with the RedOx furnace.

According to an eighth illustrative embodiment, the RedOx furnace of any one of the first to seventh illustrative embodiments, further comprising a supply of the other sulfur-containing stream in fluid communication with the RedOx furnace.

According to a ninth illustrative embodiment, the RedOx furnace of any one of the first to eighth illustrative embodiments, further comprising a supply of pure oxygen in fluid communication with the RedOx furnace.

According to a tenth illustrative embodiment, the RedOx furnace of any one of the first to ninth illustrative embodiments, further comprising a supply of atmospheric combustion air in fluid communication with the RedOx furnace.

According to an eleventh illustrative embodiment, the RedOx furnace of any one of the first to tenth illustrative embodiments, further comprising a means to combine pure oxygen from the supply of pure oxygen with the combustion air.

According to a twelfth illustrative embodiment, the RedOx furnace of any one of the first to eleventh illustrative embodiments, further comprising a supply of combustion fuel in fluid communication with the combustion fuel stream inlet of the reduction chamber.

According to a thirteenth illustrative embodiment, the RedOx furnace of any one of the first to twelfth illustrative embodiments, further comprising at least one burner engaged with and in fluid communication with the reduction chamber.

According to a fourteenth illustrative embodiment, the RedOx furnace of any one of the first to thirteenth illustrative embodiments further comprising an atmospheric combustion air, an oxygen-enriched combustion air stream, or a pure oxygen stream passage at least partially positioned within the burner.

According to a fifteenth illustrative embodiment, the RedOx furnace of any one of the first to fourteenth illustrative embodiments further comprising a combustion fuel stream passage at least partially positioned within the burner.

It will be understood that the embodiments described herein are merely exemplary, and that a person skilled in the art may make variations and modifications without departing from the spirit and scope of the invention. All such variations and modifications are intended to be included within the scope of the invention as provided in the appended claims. It should be understood that the embodiments described above are not only in the alternative but can be combined.

What is claimed is:

1. A process for decomposing at least one of a spent sulfuric acid stream or other sulfur-containing stream in a RedOx furnace, the process comprising:
   supplying at least one of the spent sulfuric acid stream or the other sulfur-containing stream into a reduction chamber of the RedOx furnace;
   supplying a pure oxygen stream into the reduction chamber;

at least partially decomposing the at least one spent sulfuric acid stream or the other sulfur-containing stream in the reduction chamber;

supplying the at least partially decomposed at least one spent sulfuric acid stream or the other sulfur-containing stream into an oxidation chamber of the RedOx furnace;

further decomposing the at least partially decomposed at least one spent sulfuric acid stream or the at least partially decomposed other sulfur-containing stream in the oxidation chamber; and increasing a capacity of the RedOx furnace for producing sulfur dioxide from the at least one spent sulfuric acid stream or the other sulfur-containing stream without increasing pressure drop through the RedOx furnace.

2. The process of claim 1, further comprising supplying a combustion fuel stream into the reduction chamber.

3. The process of claim 2, further comprising supplying the combustion fuel stream into the reduction chamber through at least one combustion fuel stream passage that is at least partially positioned within a burner for the RedOx furnace, the at least one combustion fuel stream passage having an end opening into the reduction chamber.

4. The process of claim 1, wherein the supplying the other sulfur-containing stream comprises supplying a stream selected from the group consisting of a stream of elemental sulfur, a stream of a sulfur-containing compound, or a stream of sulfur-containing refinery acid gas.

5. The process of claim 1, wherein the supplying the at least one spent sulfuric acid stream into the reduction chamber comprises injecting the at least one spent sulfuric acid stream into the reduction chamber with at least one spent sulfuric acid injector at least partially positioned within a burner for the RedOx furnace, or supplying the at least one other sulfur-containing stream into the reduction chamber by injecting the at least one other sulfur-containing stream into the reduction chamber with at least one other sulfur-containing stream injector at least partially positioned within the burner.

6. The process of claim 1, wherein the supplying the pure oxygen stream into the reduction chamber comprises supplying through a pure oxygen stream passage at least partially positioned within a burner.

7. The process of claim 1, wherein the supplying at least one spent sulfuric acid stream into the reduction chamber is through a spent sulfuric acid stream passage that is at least partially positioned within a burner for the RedOx furnace, supplying a combustion fuel stream into the reduction chamber is through the combustion fuel stream passage that is at least partially positioned within the burner, and the supplying at least one pure oxygen stream into the reduction chamber is through a pure oxygen stream passage that is at least partially positioned within the burner.

8. The process of claim 1, comprising supplying at least one other sulfur-containing stream into the reduction chamber through another sulfur-containing stream passage that is at least partially positioned within a burner, supplying the combustion fuel stream into the reduction chamber through a combustion fuel stream passage that is at least partially positioned within the burner, and supplying the pure oxygen stream into the reduction chamber through a pure oxygen stream passage that is at least partially positioned within the burner.

9. The process of claim 6, further comprising supplying the pure oxygen directly into the reduction chamber through a pure oxygen injector in direct fluid communication with the pure oxygen stream passage.

10. The process of claim 1, further comprising supplying a stream selected from the group consisting of atmospheric combustion air stream, an oxygen-enriched atmospheric combustion air stream, and another pure oxygen stream into the oxidation chamber of the RedOx furnace.

11. The process of claim 1, further comprising supplying a stream selected from the group consisting of atmospheric combustion air stream, an oxygen-enriched atmospheric combustion air stream, and another pure oxygen stream into a duct interconnecting and in fluid communication with the reduction chamber and the oxidation chamber.

12. The process of claim 11, comprising heating the atmospheric combustion air stream, the oxygen-enriched atmospheric combustion air stream, or the another pure oxygen stream prior to the supplying the atmospheric combustion air stream, the oxygen-enriched atmospheric combustion air stream, or the other pure oxygen stream into the oxidation chamber.

13. The process of claim 11, comprising introducing pure oxygen into the atmospheric combustion air stream to prepare an oxygen-enriched combustion air stream prior to the supplying oxygen-enriched combustion air into the oxidation chamber.

14. The process of claim 1, further comprising:

delivering a proportion of oxygen to a combustion air stream for the RedOx furnace and to at least one injector for the RedOx furnace; and determining the proportion of the oxygen to be delivered based upon a temperature measured proximate a flame in the reduction chamber or a theoretical adiabatic temperature of a mixture of sulfur, air and oxygen delivered through the at last one injectors.

15. A process for decomposing at least one of a spent sulfuric acid stream or other sulfur-containing stream in a RedOx furnace, the process comprising:

supplying at least one of the spent sulfuric acid stream or the other sulfur-containing stream into a reduction chamber of the RedOx furnace;

supplying a pure oxygen stream into the reduction chamber;

at least partially decomposing the at least one spent sulfuric acid stream or the other sulfur-containing stream in the reduction chamber;

supplying the at least partially decomposed at least one spent sulfuric acid stream or the other sulfur-containing stream into an oxidation chamber of the RedOx furnace;

further decomposing the at least partially decomposed at least one spent sulfuric acid stream or the at least partially decomposed other sulfur-containing stream in the oxidation chamber; and increasing a capacity of the RedOx furnace for producing sulfur dioxide from the at least one spent sulfuric acid stream or other sulfur-containing stream without increasing volumetric flow rate of the RedOx furnace.

16. A process for decomposing at least one of a spent sulfuric acid stream or other sulfur-containing stream in a RedOx furnace, the process comprising:

supplying at least one of the spent sulfuric acid stream or the other sulfur-containing stream into a reduction chamber of the RedOx furnace;

supplying a pure oxygen stream into the reduction chamber;

at least partially decomposing the at least one spent sulfuric acid stream or the other sulfur-containing stream in the reduction chamber;

supplying the at least partially decomposed at least one spent sulfuric acid stream or the other sulfur-containing stream into an oxidation chamber of the RedOx furnace;

further decomposing the at least partially decomposed at least one spent sulfuric acid stream or the at least partially decomposed other sulfur-containing stream in the oxidation chamber; and increasing a capacity of the RedOx furnace for producing sulfur dioxide from the at least one spent sulfuric acid stream or other sulfur-containing stream without increasing a temperature of exit gas from the RedOx furnace.

17. A process for decomposing at least one of a spent sulfuric acid stream or other sulfur-containing stream in a RedOx furnace, the process comprising:

supplying at least one of the spent sulfuric acid stream or the other sulfur-containing stream into a reduction chamber of the RedOx furnace;

supplying a pure oxygen stream into the reduction chamber;

at least partially decomposing the at least one spent sulfuric acid stream or the other sulfur-containing stream in the reduction chamber;

supplying the at least partially decomposed at least one spent sulfuric acid stream or the other sulfur-containing stream into an oxidation chamber of the RedOx furnace;

further decomposing the at least partially decomposed at least one spent sulfuric acid stream or the at least partially decomposed other sulfur-containing stream in the oxidation chamber; and increasing a capacity of the RedOx furnace for producing sulfur dioxide from the at least one spent sulfuric acid stream or other sulfur containing stream without increasing NOx emissions.

* * * * *